W. H. SMITH.
LOCKING VALVE FOR FUEL OIL TANKS.
APPLICATION FILED APR. 22, 1913.

1,124,965.

Patented Jan. 12, 1915.

WITNESSES.
P. L. Bruck.
Brennan B. West

INVENTOR.
William H. Smith
By Hull & Smith
Attys.

UNITED STATES PATENT OFFICE.

WILLIAM H. SMITH, OF CLEVELAND, OHIO.

LOCKING-VALVE FOR FUEL-OIL TANKS.

1,124,965.  Specification of Letters Patent.  Patented Jan. 12, 1915.

Original application filed December 31, 1910, Serial No. 600,355. Divided and this application filed April 22, 1913. Serial No. 762,909.

*To all whom it may concern:*

Be it known that I, WILLIAM H. SMITH, a citizen of the United States, residing at Cleveland, in the county of Cuyahoga and State of Ohio, have invented a certain new and useful Improvement in Locking-Valves for Fuel-Oil Tanks, of which the following is a full, clear, and exact description, reference being had to the accompanying drawings.

This invention relates to valves and has for its particular object the provision of a valve or cock of the turning-plug type that shall be particularly suitable for use in connection with liquid storage and delivery tanks.

More specifically the objects of the invention are the provision of a device of this character having simple and rugged locking means whereby the accidental opening of the valve may absolutely be prevented, and the felonious opening of the same by others rendered so difficult as largely to be avoided; this application being a division of my prior copending application, filed December 31, 1910, Ser. No. 600,355.

One embodiment of my invention is illustrated in the accompanying drawings, wherein—

Figure 1:
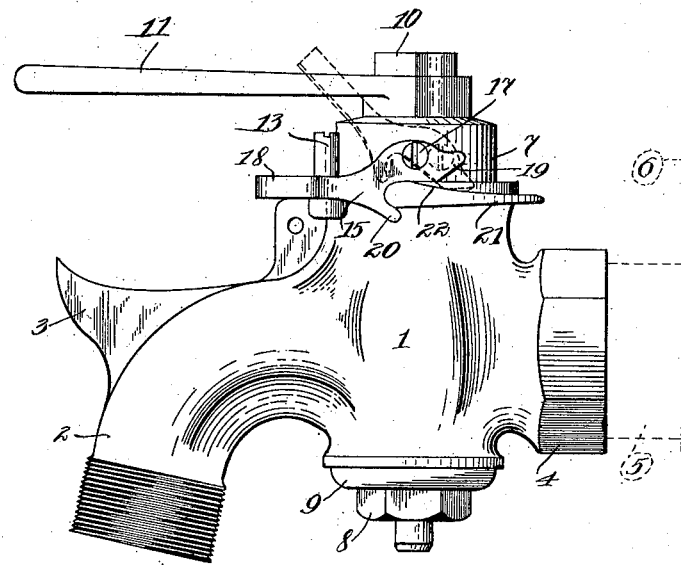
Figure 2:
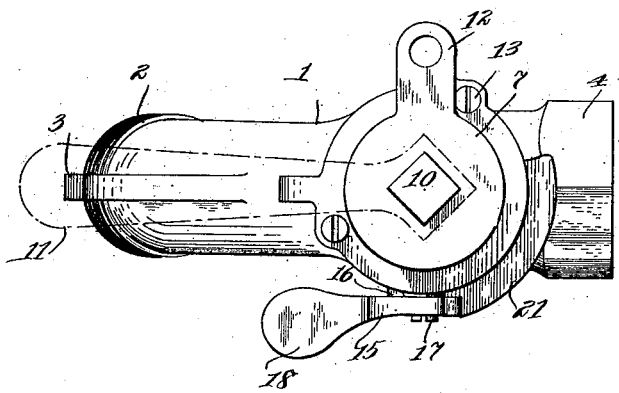

Figure 1 is a side elevation of a complete valve with the plug in "off" or closed position, and Fig. 2 is a plan view of the valve also showing the parts in closed position.

Describing the parts by reference characters, 1 represents the body of the valve, 2 the discharge spout, 3 the pail receiving lug carried by the discharge spout, and 4 the socket by means of which the valve may be attached to the outlet pipe or nipple 5 of a tank or the like 6.

Rotatably mounted in a suitable seat within the body 1 is a valve plug 7 secured in place in any convenient manner as by the nut 8 and washer 9. The upper end of this plug is formed with a prismatic stud 10 for the reception of a removable wrench 11 whereby the plug may be turned. The plug may also, if desired, be formed with a laterally projecting perforated lug 12 adapted to register with a similar lug (not shown) carried by the casing to permit the permanent locking of the valve by means of a padlock or similar device. Stop pins 13 are also carried by the casing and coöperate with a suitable part of the valve plug, such as the projection 12, to limit the turning movement of the valve, as may be desired, the movement of ninety degrees herein shown being sufficient for most purposes.

While the employment of a padlock or like locking means to prevent the turning of the plug by thieves during the night or at other times when the tank is left unguarded for a considerable time is entirely efficacious, it is inconvenient to employ such a lock during the day time when it is desired frequently to open the valve for the withdrawal of liquid as when the same is used upon a delivery wagon. At the same time it is desirable that some means should be provided for automatically locking the plug against accidental opening owing to the jarring and vibration to which it is subjected. My preferred expedient consists of a hook or latch 15 pivoted upon a boss 16 formed on the side of the turning plug, the latch being secured thereon in any convenient manner as by the screw 17. The forwardly extending portion of this latch is flattened as at 18 to form a finger piece, and the rearwardly extending portion is made of wedge or cam shape, as shown at 19. Between the pivot and the finger piece, the lower surface of the latch is provided with a hook-shaped projection 20, the inner face of which substantially follows the arc of a circle of which the pivot is the center. This projection engages the rounded front end of a horizontally projecting arcuate plate or ledge 21 carried by the stop-cock casing. The upper face of this ledge is upwardly slanted near its front edge to form an inclined plane 22. The handle 11 of the stop cock is shown in full lines in Fig. 1 and in dotted lines in Fig. 2, and may, of course, be applied to the boss 10 in any one of four positions, but is preferably applied so as to be parallel with the latch 15 and permit that latch to be operated by the fingers of the hand that operates the stop cock. It will be noted that when the latch is raised the hook 20 moves upwardly and forwardly about the pivot 17, but cannot be raised high enough to clear the end of the ledge 21 owing to the engagement of the farther end of the latch with the inclined plane 22. It does, however, move away from the end of that ledge far enough to permit some movement of the plug, which brings the rear end of the latch to a lower portion of the inclined plane, thus permitting the hook to be raised yet higher and finally permitting it to clear the ledge entirely. The angle of rotation of the plug is limited by the engagement of the lug 12 with the stop pin 13—13, or by similar suitable means. The angular extent of the ledge 21 is not less than this amount, so that the latch may be positively held from jarring or falling out of operative position and requiring the time and attention of the attendant to keep it in working condition. Upon closing the cock, the hook 20 rides upon the ledge until it clears the end thereof, whereupon the contact of the inclined plane 22 with the rear end 19 of the latch causes the hook to be positively forced downwardly toward locking position. The unbalanced condition of the hook causes it to keep its locking position under the action of gravity and permits the omission of all springs, while the interaction of the inclined plane and the rear portion of the latch gives the latch a positive impulse toward locking position and overcomes any tendency to stick such as is sometimes apparent in cold weather. Also it will be seen that the raising of the latch and the turning of the plug must take place simultaneously, the raising of the same being effected by the finger piece 18, and the turning by the handle 11. When the valve is closed the handle will ordinarily be removed, thereby rendering very difficult the turning of the valve and minimizing the purloining of liquid.

Having thus described my invention what I claim is:—

1. In a turning plug stop cock, the combination, with the turning plug and its casing, the axis of said plug being substantially vertical, of an arcuate ledge carried by said casing and having an abrupt end, the upper surface of said ledge being upwardly inclined adjacent to said end, and a latch pivoted to the turning plug and having a downwardly turned hook portion adapted to engage the end of said ledge to lock said plug in closed position, said latch having a portion upon the other side of its pivot from said hook portion and adapted to engage said inclined surface when said plug is moved to closed position, whereby said latch is positively moved to locking position.

2. In a turning plug stop cock, the combination, with the turning plug and its casing, of a shouldered projection carried by said casing, and a latch pivoted to said turning plug adjacent to said projection, said latch having a hook on one side of its pivot adapted to engage the shoulder of said projection to lock said turning plug in closed position and also having an extension on the other side of its pivot adapted to engage said projection when said plug has been moved nearly to closed position and move said hook to locking position.

3. In a turning-plug stop-cock, the combination, with the turning plug and its casing, of a ledge carried by said casing and having an abrupt shoulder and an inclined portion adjacent said shoulder, and a latch pivoted to said turning plug adjacent said ledge, said latch having an extension on one side of its pivot adapted to ride along the top of said ledge, and a hook at the other side of said pivot and adapted to engage said shoulder, the relative dimensions of said extension and of said inclined portion being such as to prevent complete raising of said latch except in connection with the turning of the plug.

4. In a turning-plug stop-cock, the combination, with the turning plug and its casing, of means for limiting the angular movement of said plug, a ledge carried by said casing and having an angular extent not less than that of the angular movement of the plug, said ledge having an abrupt shoulder at one end, and a latch pivoted to said plug adjacent said ledge and having an extension on each side of its pivot adapted to ride on said ledge, one of said extensions being hook-shaped for locking coöperation with said shoulder.

5. In a turning-plug stop-cock, the combination, with the turning-plug and its casing, said casing having a projection, of a gravity-operated latch pivoted to said turning plug and adapted to engage said projection, and means carried by said casing and coöperating with said latch for positively moving said latch into engaging position upon the movement of said turning plug to close the stop-cock.

6. In a valve, the combination, with a casing and a rotatable member in said casing and controlling the passageway therethrough, of a positive locking device pivoted to said rotatable member and having a finger piece projecting radially therefrom, means preventing the disengagement of said locking device from said casing excepting simultaneously with the rotation of said movable member, and a detachable handle adapted to be applied to said movable member and to project radially therefrom adjacent to said locking device whereby said member may be turned.

7. In a valve, the combination, with a casing and a rotatable member in said casing and controlling the passageway therethrough, of a locking device pivoted to said rotatable member upon an axis transverse to the axis of said member and having a finger piece projecting radially therefrom, hook means carried by said locking device and engaging said casing when said device is depressed, other means carried by said locking device and preventing the disengagement of said hook from said casing excepting simultaneously with the rotation of said movable member, and a detachable handle adapted to be applied to said movable member and to project radially therefrom adjacent to and above said locking device, said handle serving as a means for turning said member and as a brace for the operation of said locking device.

In testimony whereof, I hereunto affix my signature in the presence of two witnesses.

WILLIAM H. SMITH.

Witnesses:
BRENNAN B. WEST,
HAROLD E. SMITH.

Copies of this patent may be obtained for five cents each, by addressing the "Commissioner of Patents, Washington, D. C."